(No Model.)
J. A. KERNODLE.
CHURN.
No. 491,737. Patented Feb. 14, 1893.
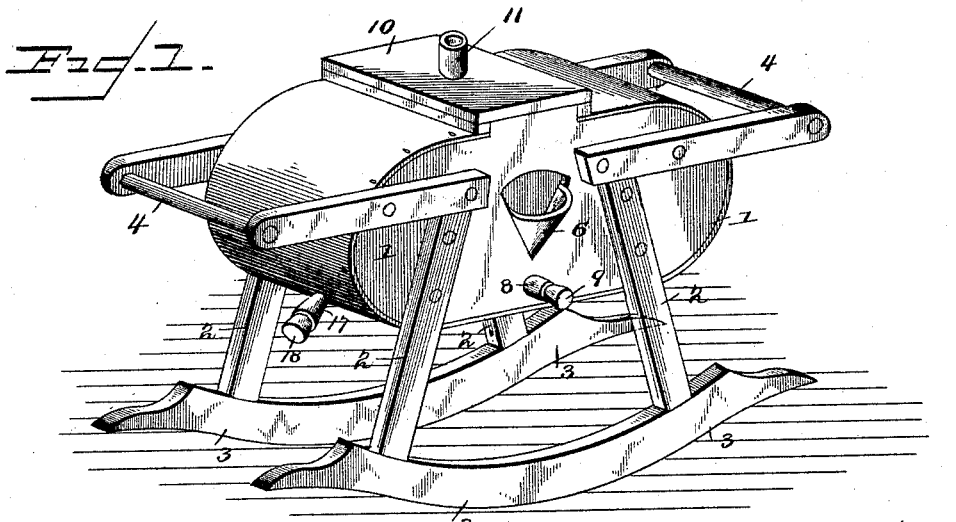
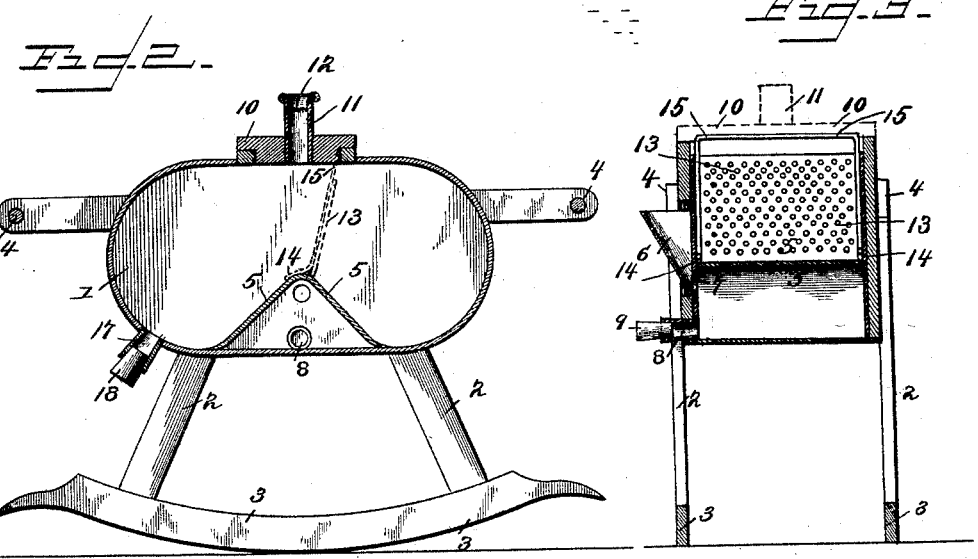
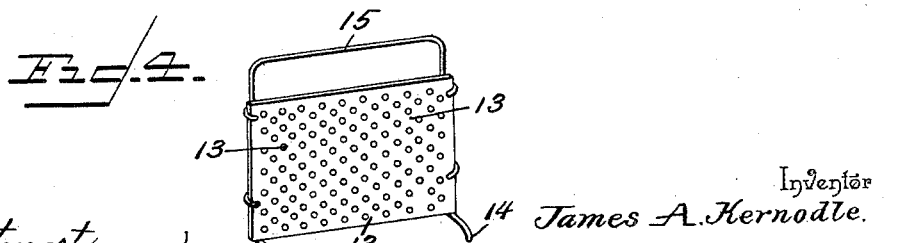
Witnesses
E. N. Stewart
H. J. Riley
Inventor
James A. Kernodle.
By his Attorneys,
C. A. Snow & Co.

UNITED STATES PATENT OFFICE.

JAMES ALFRED KERNODLE, OF REIDSVILLE, NORTH CAROLINA, ASSIGNOR OF TWO-THIRDS TO GEORGE W. ELLINGTON AND GEORGE S. KERNODLE, OF SAME PLACE.

CHURN.

SPECIFICATION forming part of Letters Patent No. 491,737, dated February 14, 1893.

Application filed August 23, 1892. Serial No. 443,878. (No model.)

*To all whom it may concern:*

Be it known that I, JAMES ALFRED KERNODLE, a citizen of the United States, residing at Reidsville, in the county of Rockingham and State of North Carolina, have invented a new and useful Improvement in Working Body-Churns, of which the following is a specification.

The invention relates to improvements in churns.

The object of the present invention is to improve the construction of churns, to provide means for maintaining milk at the desired temperature for churning, and to enable the butter to be readily separated for removing from the churn body.

The invention consists in the construction and novel combination and arrangement of parts hereinafter fully described, illustrated in the accompanying drawings and pointed out in the claim hereto appended.

In the drawings—Figure 1 is a perspective view of a churn constructed in accordance with this invention. Fig. 2 is a longitudinal sectional view, the churning attachment being in position, in dotted lines. Fig. 3 is a transverse sectional view of the same. Fig. 4 is a detail perspective view of the strainer.

Like numerals of reference indicate corresponding parts in all the figures of the drawings.

1 designates a churn body supported by legs 2 and mounted on rockers 3 and having handles 4 arranged at its ends, whereby the churn may be readily operated by rocking it. The churn body is provided with sheet metal bottom and ends, which are rounded, and which during the rocking of the body serves to agitate the milk greatly and to produce butter quickly. Within the churn body and on the bottom of the same is arranged an inverted V-shaped partition 5, which causes an increased agitation of the milk and which forms a water chamber adapted to contain either hot or cold water to maintain the milk being churned at the desired temperature. The water is supplied to the chamber through a funnel-shaped mouth 6 which communicates with the water chamber by an opening 7, and the water is drained from the chamber by means of a discharge tube 8 which is normally closed by a plug 9 or the like.

The top of the churn body is provided with a cover 10 which has a vertical tubular handle 11, and the latter is provided with a wire gauze screen 12, and enables the gases evolved in churning to escape and prevents flies or the like entering the churn through the tubular handle.

After the operation of churning has been completed the butter is separated and strained by means of a rectangular strainer 13 which fits snugly between the sides of the body and and extends transversely of the same. The strainer is provided at its lower end with curved arms 14 which engage the apex of the inverted V-shaped compartments, and the top of the strainer rests against one side of the mouth or opening at the top of the body, and is provided with a handle 15. By inclining the body of the churn its contents run from the high end to the lower end, and pass through the strainer thereby separating the butter, and the remaining liquid is drawn through and removed from a discharge tube 17 which is normally closed by a plug 18.

It will be seen that the churn is simple and comparatively inexpensive in construction, that it may be readily operated, that the contents may be maintained at the desired temperature, and that after the operation of churning is completed, the butter is readily separated from the remaining liquid.

What I claim is—

In a churn, the combination of a body provided with rockers and having rounded ends, an inverted V-shaped partition arranged within the body and mounted on the bottom and forming a water chamber, and a rectangular strainer arranged transversely of the body and having its lower end mounted on the apex of the partition and provided with curved arms engaging the same and having its upper end resting against the top of the body and provided with a handle, substantially as described.

In testimony that I claim the foregoing as my own I have hereto affixed my signature in the presence of two witnesses.

JAMES ALFRED KERNODLE.

Witnesses:
R. L. WATT,
EUGENE IRVIN.